(12) United States Patent
Pylappan et al.

(10) Patent No.: US 11,368,817 B2
(45) Date of Patent: Jun. 21, 2022

(54) CONTENT CONVERSION TRACKING BASED ON LOCATION DATA

(71) Applicant: CURBSIDE INC., Palo Alto, CA (US)

(72) Inventors: Seejo Pylappan, Cupertino, CA (US); Denis Laprise, Sunnyvale, CA (US); Jaron Waldman, Palo Alto, CA (US)

(73) Assignee: RAKUTEN GROUP, INC., Tokyo (JP)

(*) Notice: Subject to any disclaimer, the term of this patent is extended or adjusted under 35 U.S.C. 154(b) by 0 days.

(21) Appl. No.: 17/228,085

(22) Filed: Apr. 12, 2021

(65) Prior Publication Data

US 2021/0329415 A1 Oct. 21, 2021

Related U.S. Application Data

(63) Continuation of application No. 16/139,546, filed on Sep. 24, 2018, now Pat. No. 10,979,857.
(Continued)

(51) Int. Cl.
*H04W 4/029* (2018.01)
*H04W 4/02* (2018.01)
(Continued)

(52) U.S. Cl.
CPC .......... *H04W 4/029* (2018.02); *G01S 19/48* (2013.01); *G01S 19/49* (2013.01);
(Continued)

(58) Field of Classification Search
CPC ............................. H04W 4/025; H04W 4/029
See application file for complete search history.

(56) References Cited

U.S. PATENT DOCUMENTS

| 8,437,948 B1 | 5/2013 | Balasundaram et al. |
| 9,037,405 B2 | 5/2015 | Gourlay et al. |
| (Continued) | | |

FOREIGN PATENT DOCUMENTS

WO WO-2009/021068 A1 2/2009

OTHER PUBLICATIONS

Office Action dated Jan. 15, 2021, in the co-pending U.S. Appl. No. 16/914,849.
(Continued)

*Primary Examiner* — Brian Whipple
(74) *Attorney, Agent, or Firm* — Polsinelli PC

(57) ABSTRACT

Systems, methods and computer-readable medium are provided for improving location determination of mobile devices and using the location information obtained via such improved methods to track content conversion. In one aspect, a computer-implemented method includes receiving a request from a third party to track at least one content; determining a reference point for at least one tracking device; activating at least one sensor on-board the at least one tracking device, the at least one tracking device determining displacement information of the at least one tracking device based on the reference point and data collected by the at least one sensor; receiving the displacement information from the at least one tracking device; identifying locations visited by the at least one tracking device based on the displacement information; and determining a content conversion rate for the at least one content based on the locations visited by the at least one tracking device.

20 Claims, 5 Drawing Sheets

Related U.S. Application Data

(60) Provisional application No. 62/666,416, filed on May 3, 2018, provisional application No. 62/666,451, filed on May 3, 2018.

(51) Int. Cl.

| | | |
|---|---|---|
| *H04L 67/53* | (2022.01) | |
| *H04L 67/565* | (2022.01) | |
| *G06Q 10/06* | (2012.01) | |
| *G01S 19/49* | (2010.01) | |
| *G01S 19/48* | (2010.01) | |
| *G08B 21/22* | (2006.01) | |
| *H04W 4/021* | (2018.01) | |
| *H04W 4/23* | (2018.01) | |
| *H04W 4/38* | (2018.01) | |
| *H04L 67/52* | (2022.01) | |
| *H04W 4/70* | (2018.01) | |
| *H04W 4/80* | (2018.01) | |
| *H04W 4/12* | (2009.01) | |
| *H04W 64/00* | (2009.01) | |
| *H04W 88/04* | (2009.01) | |
| *G06Q 30/06* | (2012.01) | |
| *G08G 1/00* | (2006.01) | |
| *G06N 20/00* | (2019.01) | |
| *G01S 19/13* | (2010.01) | |

(52) U.S. Cl.
CPC . *G06Q 10/063114* (2013.01); *G06Q 30/0633* (2013.01); *G08B 21/22* (2013.01); *G08G 1/205* (2013.01); *H04L 67/18* (2013.01); *H04L 67/20* (2013.01); *H04L 67/2823* (2013.01); *H04W 4/021* (2013.01); *H04W 4/023* (2013.01); *H04W 4/025* (2013.01); *H04W 4/12* (2013.01); *H04W 4/23* (2018.02); *H04W 4/38* (2018.02); *H04W 4/70* (2018.02); *H04W 4/80* (2018.02); *H04W 64/003* (2013.01); *H04W 88/04* (2013.01); *G01S 19/13* (2013.01); *G06N 20/00* (2019.01)

(56) References Cited

U.S. PATENT DOCUMENTS

| | | |
|---|---|---|
| 9,958,280 B2 | 5/2018 | Scofield et al. |
| 10,013,462 B2 | 7/2018 | Priness |
| 10,750,374 B1 | 8/2020 | Keshavamurthy |
| 2005/0243784 A1 | 11/2005 | Fitzgerald |
| 2006/0077897 A1 | 4/2006 | Kotzin |
| 2006/0167784 A1 | 7/2006 | Hoffberg |
| 2007/0015518 A1 | 1/2007 | Winter et al. |
| 2007/0124244 A1 | 5/2007 | Mock |
| 2008/0100475 A1 | 5/2008 | Horstemeyer |
| 2008/0248815 A1 | 10/2008 | Busch |
| 2008/0270233 A1 | 10/2008 | Yip et al. |
| 2010/0027527 A1 | 2/2010 | Higgins |
| 2011/0133888 A1 | 6/2011 | Stevens |
| 2014/0278032 A1 | 9/2014 | Scofield |
| 2015/0324851 A1 | 11/2015 | Campbell |
| 2016/0027307 A1 | 1/2016 | Abhyanker et al. |
| 2016/0189098 A1 | 6/2016 | Beaurepaire |
| 2017/0076227 A1 | 3/2017 | Elgie et al. |
| 2017/0347279 A1 | 11/2017 | Bejerano |
| 2018/0174444 A1 | 6/2018 | Serrano |
| 2018/0224291 A1 | 8/2018 | Tuukkanen et al. |
| 2018/0338237 A1 | 11/2018 | Maheswaranathan |
| 2019/0322367 A1 | 10/2019 | El Idrissi |
| 2019/0340560 A1 | 11/2019 | Sundia |
| 2019/0385450 A1 | 12/2019 | Kim |
| 2020/0202472 A1 | 6/2020 | Barak |
| 2020/0234385 A1 | 7/2020 | Vanslette |

OTHER PUBLICATIONS

Office Action dated Feb. 3, 2021, in the co-pending U.S. Appl. No. 16/402,408.
Office Action dated Oct. 20, 2020 in the co-pending U.S. Appl. No. 16/402,408.
International Search Report and Written Opinion dated Jul. 16, 2019 for corresponding PCT Application No. PCT/US2019/030557.
Notice of Allowance dated Jul. 15, 2021 for co-pending U.S. Appl. No. 16/914,849.
U.S. Appl. No. 16/402,408, filed May 3, 2019.
U.S. Appl. No. 16/914,849, filed Jun. 29, 2020.

CONTENT CONVERSION TRACKING BASED ON LOCATION DATA

This application claims priority to U.S. application Ser. No. 16/139,546, filed on Sep. 24, 2018, which claims priority to U.S. Provisional Application 62/666,416, filed on May 3, 2018 and U.S. Provisional Application 62/666,451, filed on May 3, 2018, the entire content of both of which are incorporated herein by reference.

TECHNICAL FIELD

The present technology pertains to systems and methods for improving location determination of tracking devices for purposes of tracking content conversion, and more specifically pertains to using on-board sensor data of the tracking device in addition to satellite signals to track content conversion rates.

BACKGROUND

Content conversion is a concept used by various content providers to measure effectiveness of content provided to users and consumers. For example, many content providers measure the effectiveness of content they provide to consumers (e.g., via their electronic device) by determining a rate at which a given content (e.g., an advertisement) resulted in the targeted user visiting a merchant's store, purchasing a product, etc.

One effective method of determining such rates can be based on tracking movement and locations of a user's electronic device. Therefore, improvements in location determination for mobile devices can directly affect measurement of effectiveness of contents provided by content providers to such mobile devices.

Global Positioning Systems (GPS) can provide a relatively accurate location information for GPS enabled mobile devices. However, there are many geographical areas in which a tracking device may not be able to obtain accurate GPS signals due to the existence of many structures and buildings in the surrounding areas of the tracking device (e.g., in a downtown area, under a bridge, in a secure building, in a mall, etc.). This can adversely affect the reading provided by the tracking device to a server. Furthermore, the accuracy of GPS signals may not be sufficient to distinguish relatively small movement of mobile devices within a given structure (e.g., from one store to an adjacent one in a shopping mall).

SUMMARY

Example embodiments are provided for improving location determination of mobile devices associated with users and using the location information obtained via such improved methods to track content conversion.

In one aspect, a computer-implemented method includes receiving a request from a third party to track at least one content; determining a reference point for at least one tracking device; activating at least one sensor on-board the at least one tracking device, the at least one tracking device determining displacement information of the at least one tracking device based on the reference point and data collected by the at least one sensor; receiving the displacement information from the at least one tracking device; identifying locations visited by the at least one tracking device based on the displacement information; and determining a content conversion rate for the at least one content based on the locations visited by the at least one tracking device.

In one aspect, a server includes memory having computer-readable instructions stored therein; and one or more processors. The one or more processors are configured to execute the computer-readable instructions to determine a reference point for at least one tracking device; active at least one sensor on-board the at least one tracking device, the at least one tracking device determining displacement information of the at least one tracking device based on the reference point and data collected by the at least one sensor; receive the displacement information from the at least one tracking device; identify locations visited by the at least one tracking device based on the displacement information; and determine a content conversion rate for at least one content based on the locations visited by the at least one tracking device.

In one aspect, one or more non-transitory computer-readable medium have computer-readable instructions stored thereon, which when executed by one or more processors, cause the one or more processors to determine a reference point for at least one tracking device; active at least one sensor on-board the at least one tracking device, the at least one tracking device determining displacement information of the at least one tracking device based on the reference point and data collected by the at least one sensor; receive the displacement information from the at least one tracking device; identify locations visited by the at least one tracking device based on the displacement information; and determine a content conversion rate for at least one content based on the locations visited by the at least one tracking device.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to obtain accurate readings of a location of a tracking device using GPS and/or sensor data. This improved location determination technique can in turn improve content conversion tracking, as will be described below.

The disclosure begins with a description of several example systems in which the concepts described herein can be implemented.

Figure 1:
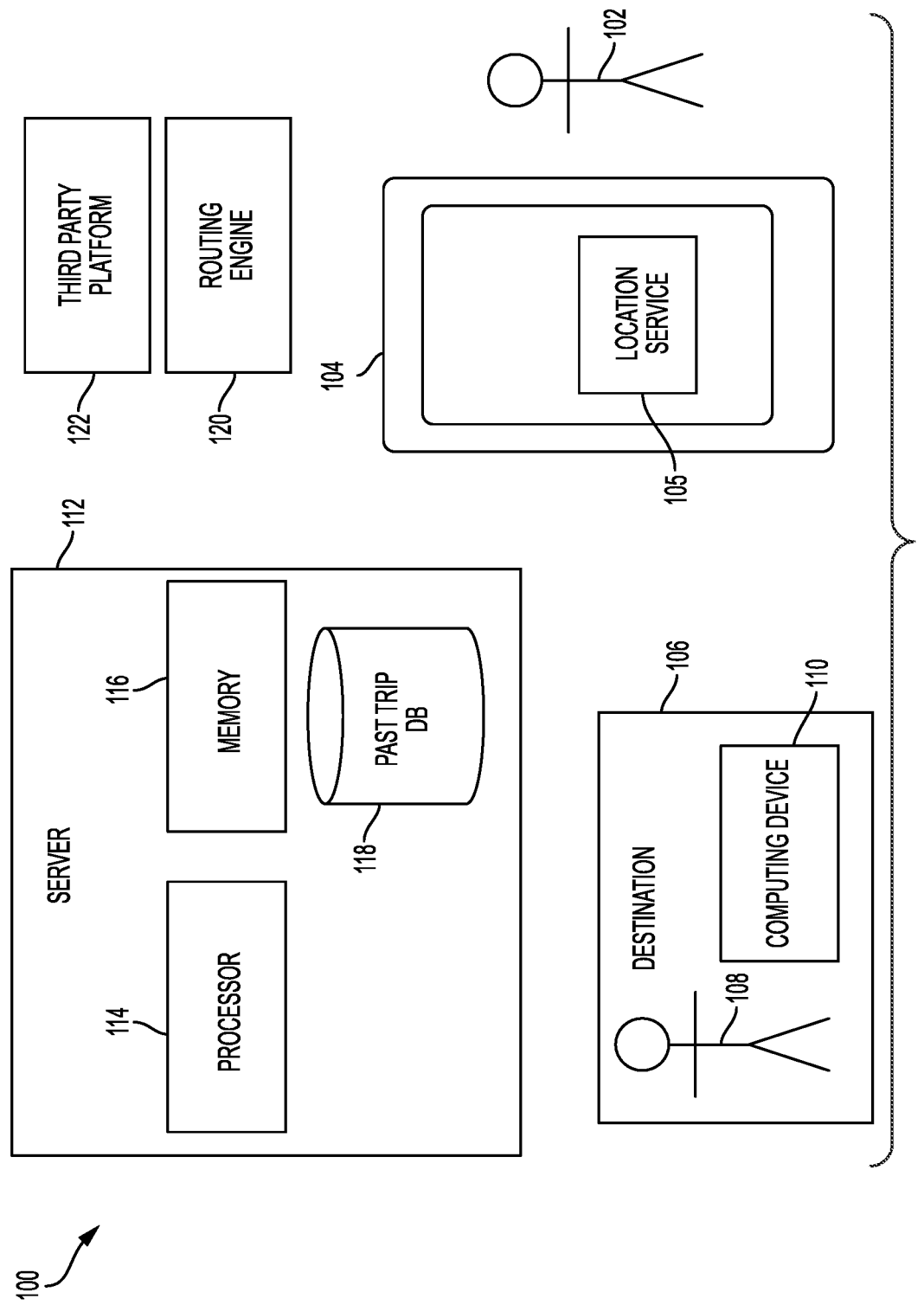
FIG. 1 shows an example system in accordance with one aspect of the present disclosure.

FIG. 1 illustrates an example system in accordance with one aspect of the present disclosure. As illustrated in FIG. 1, system 100 includes a user 102 associated with a tracking device 104 (user device 104 or customer device 104). While not shown in FIG. 1, user 102 and tracking device 104 can be associated with a moving object including, but not limited to, a car, a bus, a bike, a public transportation vehicle, etc. The tracking device 104 can be any known or to be developed electronic device capable of tracking a movement of the user 102 (and the associated moving object) and communication the same with a server 112 over a wired and/or wireless communication platform such as over a cellular network or a WiFi connection. Examples of tracking device 104 include, but are not limited to, a cellular phone, a personal digital assistant (PDA), a laptop, a tablet, a wristband tracking object, etc. In one example, tracking device 104 has location service 105. Location service 105 can be any known or to be developed built-in sensor, device and/or location determining component such as a global positioning system (GPS) device capable of recording geographical coordinates (e.g., latitude and longitude) of tracking device 104 at any given point in time.

While not shown in FIG. 1, tracking device 104, server 112 and any other component of system 100 have other components for enabling communication with other components such as transceivers.

The system 100 further includes a destination 106. Destination 106 can be a target location that is to receive arrival alerts from server 112 informing an operator thereof of the timing of user 102's arrival at destination 106. For example, destination 106 can be a brick-and-mortar store, from which user 102 has ordered item(s) for purchase and is en route to pick up the order. Other examples of destination 106 include, but are not limited to, a restaurant, a department store, other types of service providers such as dry cleaning services, a library, etc. Therefore, it is important for server 112 to provide an arrival alert to destination 106 at a threshold time ahead of the arrival of user 102 (e.g., 8 minutes prior to user's arrival at destination 106) to ensure that the ordered item(s) is/are ready when user 102 arrives at destination 106. Therefore, the arrival alert needs to be as accurate as possible to avoid or reduce inconveniences (e.g., waiting for the ordered item(s) to be prepared for a period of time after arrival) experienced by user 102 and/or an operator at destination 106.

Destination 106 can have an operator 108 associated therewith such as an employee. Furthermore, destination 106 can have a computing device 110 with which operator 108 interacts to receive arrival alerts, send and receive identifying information to server 112 and/or track device 104, confirm/cancel/adjust orders, etc. Computing device 110 can be any known or to be developed device that is used by destination 106 and is capable of communicating with server 112 over a wired and/or wireless connection such as a WiFi connection. Examples of computing device 110 include, but are not limited to, a tablet, a stationary computer device, a mobile device, any other known or to be developed Point of Sale (POS) devices, etc.

System 100 also includes server 112. Server 112 can have one or more processors such as processor 114 capable of implementing one or more sets of computer-readable instructions stored in one or more memories such as memory 116. Execution of any one or more of these sets of instructions enable server 112 to implement functionalities of methods described below with reference to FIGS. 3-5. These functionalities include, but are not limited to, building destination specific models using machine learning, which can then be used to provide arrival prediction services, determining smart signaling for location receiving location updates, etc.

As shown in FIG. 1, server 112 can also have database 118 (can also be referred to as past trips database 118). Data stored in database 118, as will be described below, will be used by machine learning algorithms implemented by server 112 to build destination specific models and perform arrival prediction services.

In one example, server 112 can provide subscription or on-demand services for destinations, users and third party platforms such as destination 106, user 102 and third party platform 122 to use services provided by server 112, as will be described below.

System 100 can also include routing engine 120. Routing engine 120 can be any conventional routing engine such as those commonly associated with mapping applications. Such routing engines may take into account distance to a destination and speed limits and in some cases current traffic, weather and time of day conditions in providing preliminary arrival times to server 112, which will be used by server 112 and logics implemented thereon to refine, revise and provide arrival alerts to destination 106. Furthermore, routing engine 120 may or may not account for other location specific factors such as most likely routes to the destination, likely stops along the way and any other learned factors for generating destination specific models for destinations at server 112.

Server 112 and routine engine 120 can be co-located physically or be configured to communicate over wired and/or wireless networks. Furthermore, each identified component of system 100 can communicate with other components of system 100 and/or any other external component using currently known or to be developed cellular and/or wireless communication technologies and platforms.

System 100 can also include a third party platform 122. Third party platform 122 can communicate with server 112 via any known or to be developed wired and/or wireless network. Third party platform 122 can be any known or to be developed content provider (e.g., a merchant, an e-commerce organization, etc.) that provides products for sale to users and customers. Third party platform 122, as will be described below, can communicate with server 112 to utilize services offered by server 112 in determining location information of user devices (e.g., tracking device 104) and using the same for content conversion tracking. While FIG. 1 illustrates a single third party platform 122, the present disclosure is not limited to just one and may include two or more third party platforms 122 utilizing services of server 112, as will be described below.

Figure 2:
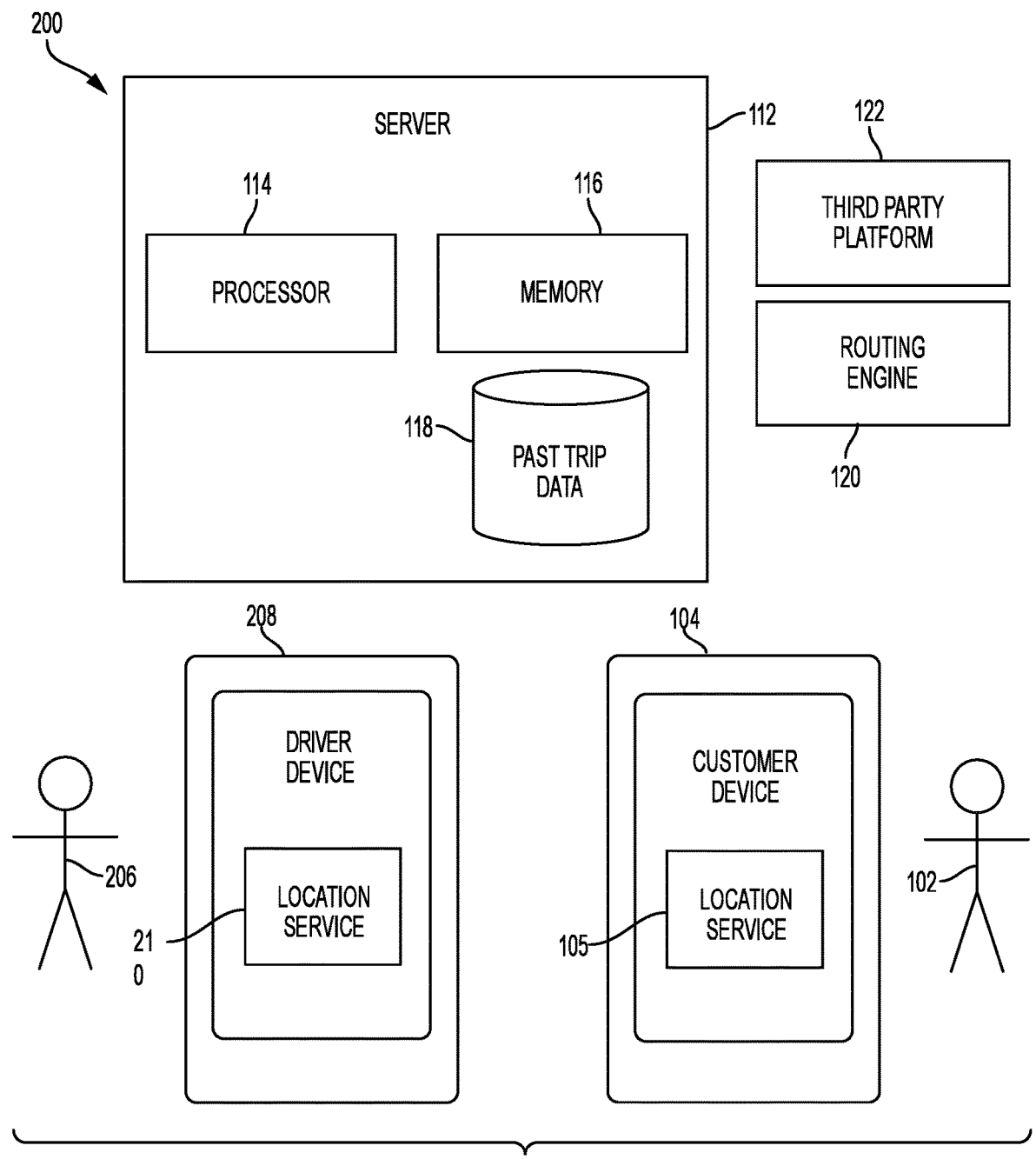
FIG. 2 shows an example system in accordance with one aspect of the present disclosure.

FIG. 2 illustrates an example system in accordance with one aspect of the present disclosure. System 200 of FIG. 2 is the same as system 100 of FIG. 1 except that instead of having user 102 travel to destination 106 to pick up item(s)/service(s) ordered as shown in FIG. 1, a destination such as destination 106 utilizes a delivery service (e.g. that of a driver) to deliver user 102's order(s) to user 102. Therefore, components of system 200 that have the same numerical reference as those in FIG. 1 will not be further described for sake of brevity.

In system 200 shown in FIG. 2, instead of destination 106 and its corresponding components, a driver 206 having an associated tracking device 208 is illustrated. In the context of FIG. 2, driver 206 and associated tracking device 208 is moving toward user 102 (similar to user 102 and tracking device 104 in FIG. 1) while user 102 is stationary (similar to destination 106 in FIG. 1). Accordingly, in the context of FIG. 2, an arrival alert is provided to user 102 informing user 102 of arrival of driver 206. Therefore, various types of calculations for location determination as described in this application are performed for determining location of tracking device 208 and estimating its arrival at user 102.

Driver 206 and tracking device 208 can be associated with a moving object such as a vehicle operated by driver 206. Tracking device 208 can be any known or to be developed electronic device capable of tracking a movement of the driver 206 (and the associated moving object) and communicate the same with server 112 over a wired and/or wireless communication platform such as over a cellular network or a WiFi connection. Examples of tracking device 208 include, but are not limited to, a cellular phone, a personal digital assistant (PDA), a laptop, a tablet, a wristband tracking object, etc. Location service 210 of tracking device 208 can be the same as location service 105 of tracking device 104 (identified as customer device 104 in FIG. 2) described above with reference to FIG. 1.

While in FIGS. 1 and 2 various components are illustrated and described, inventive concepts are not limited thereto. For example, the number of users, devices, destinations, servers, third party platform(S) etc., are not limited to those described and can be more or less. Furthermore, both systems 100 and 200 can have additional components, architecture and/or functionalities associated therewith that are ordinary and/or necessary for proper operations thereof and thus are within the scope of the present disclosure.

Furthermore, while FIGS. 1 and 2 are two examples of systems in which the concepts described below can be implemented, the present disclosure is not limited thereto. For example, a system in which the present concepts can be implemented need to necessarily involve a tracking device or a driver device traveling to a destination or to a customer device but can simply be a server such as server 112 tracking a moving object such as tracking device 104, driver device 208, etc.

As briefly mentioned above, server 112 is tasked with tracking a moving object associated with user 102. Information regarding a tracked object may be utilized for various purposes including, but not limited to, content conversion tracking, providing arrival alerts to an intended destination for an impending arrival of the moving object at the intended destination (e.g., in order to provide an alert to destination 106 at a threshold time ahead of user 102's arrival at destination 106, so that operator 108 at destination 106 can prepare and ready order(s) for user 102 to pick up when he or she arrives at destination 106), etc.

Server 112 implements various techniques to improve the accuracy of determining a location of a moving object such as tracking device (customer device) 104. For example, server 112 applies machine learning to various statistical data to create destination specific model(s) for destination 106. Various statistic data can include, but is not limited to, past completed trips of users to destination 106, past completed trips of user 102, traffic conditions, modes of transportation, types of moving objects associated with user 102 (and/or driver 206 in FIG. 2), weather conditions, times of days, events taking place en route to destination 106 or at destination 106, speed of the moving object, any construction, road closures and improvement, historical stops made by user 102 on such route and/or purchases made en route, etc. The statistical data can be stored in database 118.

For example, a particular brick-and-mortar store maybe located in a downtown area where traffic conditions vary greatly depending on time of day. Server 112 takes this information into consideration to build a destination specific model for the brick-and-mortar store located in the downtown area. Accordingly, in determining location information of user 102 as user 102 travels to the downtown location of the brick-and-mortar store and depending on the time of day, server 112 can augment its prediction and improve the determination of location information of user 102 using the corresponding destination specific model and/or other historical data in database 118 corresponding to visits/stops of user 102 en route. For example, user 102 may typically stop at a particular gas station or a particular convenient store whenever user 102 visits the brick-and-mortar store. Such information is also taken into consideration by server 112 in determining location information of user 102.

Figure 3:
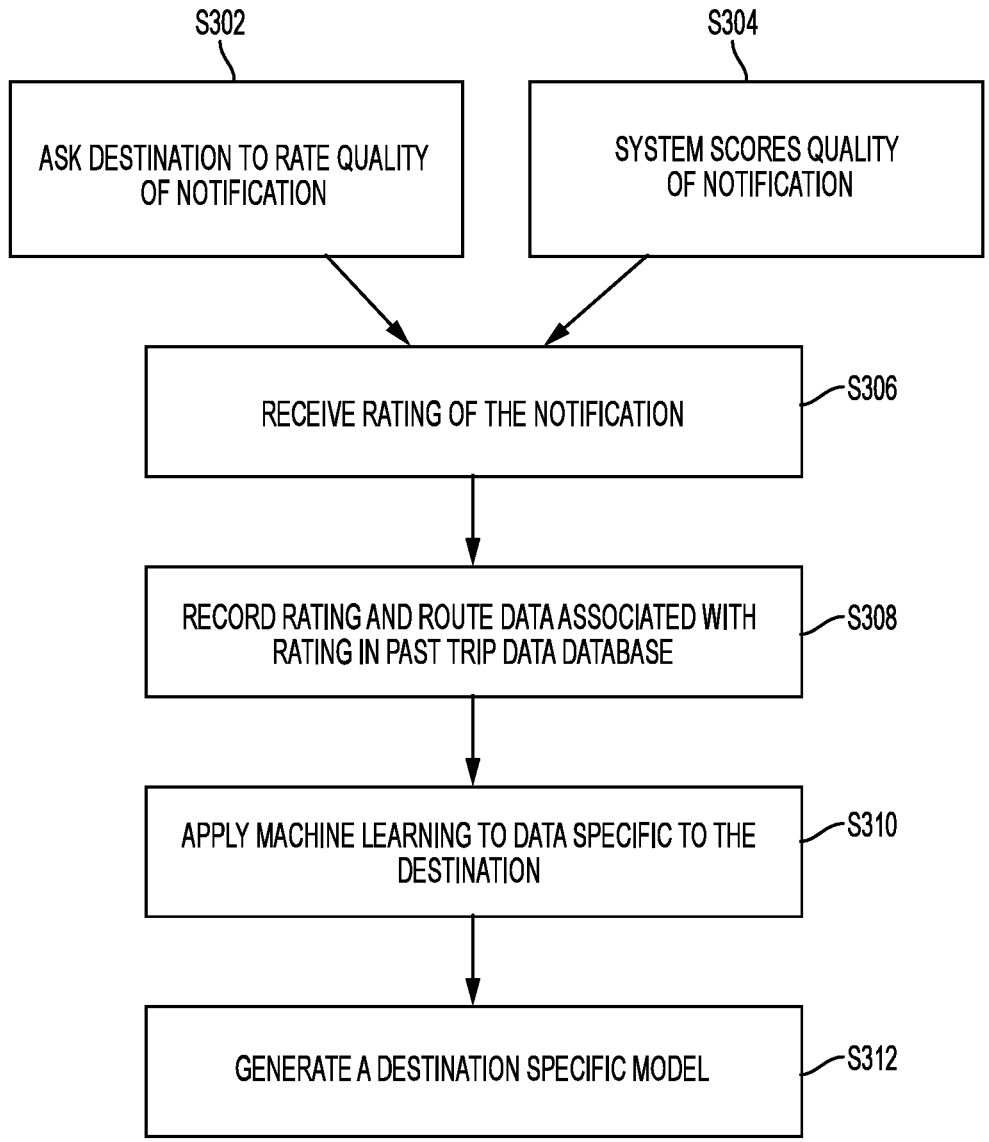
FIG. 3 is a method for creating a destination specific model in accordance with one aspect of the present disclosure.

FIG. 3 illustrates an example method of creating destination specific models in accordance with one aspect of the present disclosure. FIG. 3 will be described with reference to FIG. 1. However, the concepts described are equally applicable to the system of FIG. 2 as well. The method illustrated in FIG. 3 begins after one or more notifications have been provided to destination computing device 110 regarding an arrival prediction of user 102 at destination 106 to pick up order(s) (or one or more trips to destination 106 have been completed). Server 112 can store a collection of data in database 118. The data can be any one or more of statistical data examples provided above. In addition, server 112 can store information regarding the quality of past notifications and an identifier of the past notifications. For example, every time server 112 has provided an arrival alert to destination 106 indicating that user 102 will arrive in 8 minutes, server 112 compares this estimated arrival time to an actual time it took user 102 to arrive at destination 106. For example, while server 112 predicted, at time T0, that user 102 will arrive at destination 106 in 8 minutes, in reality, it may take user 102 6 minutes from T0 to arrive at destination 106. This indicates a prediction error of 25%. Server 112 stores this prediction error in database 118. During the next round of prediction and in providing the arrival alert, server 112 adjusts its prediction by 25% before providing the arrival alert (e.g., in the particular example described above, instead of providing the arrival alert at T0, server 112 now provides the arrival alert at T1 which is 2 minutes earlier than T0).

At S302, server 112 queries computing device 110 of destination 106 for rating a quality of a recently provided arrival alert. Operator 108 operating destination computing device 110 can respond to the query. Upon receiving the response, server 112 stores the rating at S306. In addition to, simultaneous with or instead of querying computing device 110 for rating, at S304, server 112 can calculate a rating or prediction error regarding the arrival alert, as described above. Similarly, the calculated rating is received at S306.

At S308, server 112 can record the received rating(s), per S302 and S304, in database 118 in association with an identification (ID) of the notification. The ID can be an identification of a particular transaction between user 102 and a merchant at destination 106, can be an identification associated with user 102, can be an identification associated with destination 106 or any combination thereof.

Server 112 can also store in database 118, information regarding a route taken by user 102 in connection with a recently completed trip to destination 106, and any other data pertinent to the trip that resulted in the notification. The route taken by user 102 can be learned from data reported by location service 105 to server 112 while user 102 and associated computing device 104 were traveling to destination 106. In some examples, from this route information, server 112 can determine if user 102 made any stops and/or any purchases while en route to destination 106. Server 112 can also record a time of day, day of week, and date associated with the notification in database 118. Server 112 can aggregate the above data for trips by many users.

At S310, server 112 applies machine learning algorithm(s) to the historical data specific to destination 106 stored in database 118. At S312, server 112 generates destination specific model for destination 106 based on the machine learning algorithm(s) applied to stored data at S310. In one example, destination specific model may be created or trained by analyzing factors associated with notifications that were considered of good quality and factors associated with notifications that were considered of poor quality. Since the destination specific model is generated through machine learning, some dimensions of destination specific model may not have any semantic meaning while some dimensions may have a semantic significance. For example, those dimensions having a semantic meaning can include likelihood that a user will make other stops along the route, likelihood that a user will encounter traffic along the route, the most likely routes to the destination, etc.

In some examples, machine learning may initially be trained on all data in database 118 regardless of destination to result in a location non-specific model. In such examples, destination specific model may be the result of tuning the location non-specific model for factors relevant to the specific destination 106.

As can be seen from the above description, server 112 relies on location updates received from tracking device 104 in order to determine current location of user 102.

The location updates received from tracking device 104 can be GPS signals (satellite signals) readings obtained by a GPS tracking device embedded in tracking device 104.

Server 112, by relying on data obtained from external sources such as a public database, may have a record of precise geographical coordinates of any given geographical location (latitude and longitude values). Such precise geographical coordinates may be referred to as registered geographical coordinates or simply registered coordinates of a given geographical location. Therefore, every time server 112 receives a GPS signal reading from tracking devices, server 112 can compare the GPS reading received, which includes latitude and longitude values of the corresponding geographical location, with the registered geographical coordinates of the same location. If the difference between any two of the received and registered latitude and longitude values two are within a threshold (e.g., less than 5 meters, 10 meters, within a margin of error of less than 5%, 10%, etc.), the server 112 would then consider the received coordinates as "precise".

Based on the above and over time, server 112 can build up a database of geographical areas in which average error of received GPS signals readings from tracking devices are not "precise". These geographical areas may be stored at server 112 and may be referred to as high error zones. Thereafter, whenever a tracking device is located within a high error zone, and as will be discussed below, any sparse "precise" GPS readings received from said tracking device may be used as a reference point after which determination of movement and hence the location of the tracking device may be augmented using on-board sensors and displacement/location calculations (information) of the tracking device. This can improve the location updates of the tracking device received at the server 112.

While using on-board sensor data can accommodate for inaccuracies in GPS signal readings when tracking device 104 is located in a high error zone, even when such GPS signal readings are "precise," reliance on GPS signal readings alone may be insufficient to track and record relatively small movements of tracking device 104. For example, GPS signal readings may be insufficient to differentiate between a tracking device's presence in two adjacent stores or two stores located on top of each other on different levels of a mall, etc. This deficiency can translate into missing user 102's presence in one store (for which an advertisement was pushed/provided to tracking device 104) and inadvertently determining user 102's presence in an adjacent store (for which no advertisement was pushed/provided to tracking device 104), which can in turn result in inaccurate determination of content conversion rates for the advertisement pushed/provided to tracking device 104.

In one or more example embodiments, a server provider associated with system 100 or system 200 of FIGS. 1 and 2 (e.g., a service provider operating server 112) can receive a request or can enter into an engagement with a third party platform (third party content provider). For example, third party platform 122 of FIG. 1 can be one that based on or more criteria, sends advertisements and/or promotions, coupons, etc. (all of which are non-limiting examples of content) to one or more particular devices or in general to devices in a given geographical location. Over a certain period of time, third party platform 122 wants to obtain information on how effective the sent content has/have been. In other words, third party platform 122 wants to understand if, over a period of hour(s), day(s), week(s), etc., one or more user devices to which the advertisement(s) or content have been sent, have visited merchant locations corresponding to the send content or not. Depending on the number of visits, purchases, etc., a rate of conversion of the content can be determined.

As will be described below, using on-board calculations of user displacement based on on-board sensor data, in addition to GPS signal based location data can result in very precise tracking of the tracking device 104, which can be used to determine which and when target merchants/products have been visited, purchased, etc., by user 102. Examples of on-board sensors used in devices such as tracking device 104 and/or driver device 208 include, but are not limited to, a gyroscope, an accelerometer, a magnetometer, etc.

Figure 4:
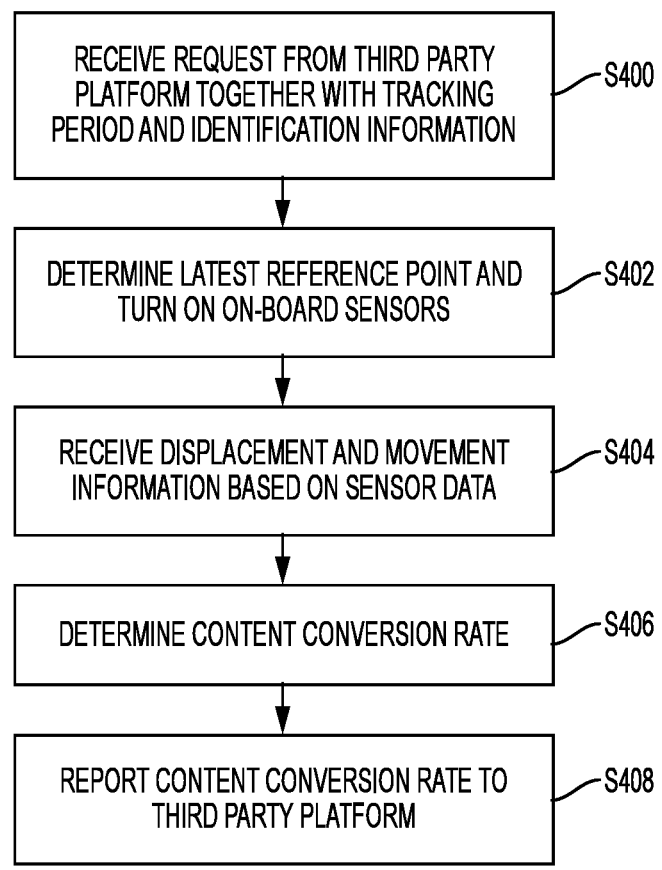
FIG. 4 is an example method of using on-board sensor data for content conversion tracking, in accordance with one aspect of the present disclosure.

FIG. 4 is an example method of using on-board sensor data for content conversion tracking, in accordance with one aspect of the present disclosure. FIG. 4 will be described from the perspective of server 112 and with reference to FIGS. 1-3. However, it is understood by those skill in the art that one or more processors such as processor 114 of server 112 executes computer readable instructions stored on or more memories such as memory 116 to implement the functionalities described below.

Furthermore, an assumption is made that service provider associated with server 112, prior to implementing the process of FIG. 4, has obtained consent from user 102 to track movement of the corresponding tracking device 104 (e.g., before, during and after the user 102 has completed and picked up an order from destination 106 using services of the service provider).

At S400, server 112 receives a request from a third party content platform (or simply a third party platform or content provider such as third party platform 122 of FIG. 1) to track content conversion rate for one or more specific content pushed/served to one or more tracking devices such as tracking device 104. Along with the request, server 112 can also receive from the third party platform a period of time (tracking period) over which the requested content conversion rate is to be determined as well as one or more identification information including, but not limited to, identification information of the pushed/served content as well as identification information of tracking devices to which the content were pushed. Hereinafter and for purposes of describing example embodiments, it is assumed that a single content with identification information AD 1 (which may be an advertisement that identifies the category and/or specific merchant associated with the advertisement) is pushed to tracking device 104 by third party advertisement platform 122 before, simultaneous with or after sending the request to server 112 at S400. Furthermore, it is assumed that the tracking period is 36 hours. These assumptions are exemplary and only provided for ease of discussion and are non-limiting. Alternatively, the tracking period can be, for example, a certain number of visits to merchant location(s), a completion of a purchase at the merchant location, etc.

At S402, server 112 implements two functions. First, server 112 identifies a "latest reference point" of at least one device (according to identification information of tracking devices received from third party platform 122). The "latest reference point" can be the most recent "precise" location of tracking device 104 according to received GPS signals, as described above. In another example, "latest reference point" can be the most recent (whether "precise" or not) GPS signal reading by tracking device 104. Second, server 112 sends one or more commands to tracking device 104 to turn on (activate) its on-board sensors to be used for tracking movement of the tracking device 104. Examples of such on-board sensors include, but are not limited to, a gyroscope, an accelerometer, a magnetometer, etc. In response to the commands, tracking device 104 enables said sensors and can collect movement and location data to perform calculations on-board in order to determine the amount of displacement of tracking device 104 since activation of the sensors. These calculations can be done according to any known or to be developed method.

In one example and in response to receiving the command at S402, tracking device 104 initiates collection of movement and displacement information of tracking device 104 using on-board sensors including, but not limited to, tracking device's accelerometer, gyroscope, magnetometer, etc. As tracking device 104 collects such movement and displacement information, it also runs algorithms stored thereon to calculate displacement and movement of the tracking device 104 based on the collected data. This can be done according to any known or to be developed method.

In one aspect and for purposes of battery conservation, tracking device 104 does not send, on a continuous basis, the calculated displacement and movement information back to server 112. Instead, all data collections and subsequent calculations (displacement information) performed on-board the tracking device 104 can be stored thereon until the tracking device 104 can establish a WiFi connection to the Internet for conveying the stored information back to server 112.

In one example, AD 1 can be an advertisement for a convenient store located inside a shopping mall. When tracking device 104 arrives in the shopping mall's parking lot, the latest reference point is determined by server 112 using the "precise" GPS signal reading received from tracking device 104.

Using this latest reference point, server 112 sends commands to the tracking device 104 to turn on on-board sensors. Then tracking device 104 starts tracking movement and displacement thereof using data collected by on-board sensors. During this time and as the user enters the shopping mall (where GPS signal reception may be sub-optimal), tracking device 104 tracks the movement of user 102 and calculates and stores visited locations and corresponding coordinates.

User 102 may then exit the shopping mall and during the next day visit another branch of the same convenient store 10 miles away (still within the example 36 hour tracking period). The tracking device using GPS signal readings and on-board sensors also records this second visit to the other branch of the same convenient store.

During this time, tracking device 104 does not send the displacement and movement calculations based on sensor data to server 112 unless a WiFi connection is established with a nearby access point.

In another example embodiment and during the tracking period, tracking device 104 may detect that tracking device 104 is stationary, in a sleep mode, etc. for a threshold period of time. Upon this detection, tracking device 104 can shut off the on-board sensors until movement of tracking device 104 is detected again, at which point tracking device 104 resumes collection location data using on-board sensors and performs on-board movement calculations based on the collected data. This provides further power conservation advantages for tracking device 104.

When the tracking device 104 establishes a connection (e.g., a WiFi connection or any other known or to be developed radio communication scheme for establishing a connection to the internet and server 112), at S404, server 112 receives updated calculation of movement and displacement (displacement information) of tracking device 104 (since last time such movements, calculations may have been reported). The reported data may include, among other information, identification information of all merchants and locations stored during such time period as well as geographical coordinates of the visited merchants and locations.

At S406, server 112 determines a rate of content conversion for AD 1 (performs content conversion tracking). In doing so and according to one example embodiment, server 112 determines if the identification information of one or more of the merchants/locations visited by tracking device 104 and reported at S404 matches the identification information for AD 1.

Furthermore and upon determining a match, server 112 may also determine a frequency of visits made to locations/stores corresponding to AD 1 over the course of the tracking period. This may be referred to as content conversion rate or in this particular example AD 1 conversion. For example, a single visit may be indicative of a 100% content conversion rate, 5 visits may be indicative of a 500% content conversion rate, etc.

In yet another example, server 112 may retrieve destination specific models for merchants associated with AD 1 and use the models to update the displacement information received at S404. For example, destination 106 (assuming destination 106 is associated with AD 1) may have a corresponding destination specific model stored in database 118, which may indicate traffic conditions around destination 106 at a particular time of day. Furthermore, the displacement information received at S404 or at least a portion thereof may be over the same time of day. Therefore, server 112 may take into consideration the traffic conditions around destination 106 to accommodate for the relatively slower traffic movement and thus update the displacement information to be more accurate in reflecting exact movement of tracking device 104 en route to destination 106.

At S408, server 112 provides the content conversion rate and any other pertinent information back to third party platform 122.

In one example, the service provider associated with systems 100 and 200 may act as a content provider to generate and push content to user devices/tracking devices. In such case, S400 and S408 need not be performed as all steps will then be performed at server 112 including providing content to user devices.

Figure 5:
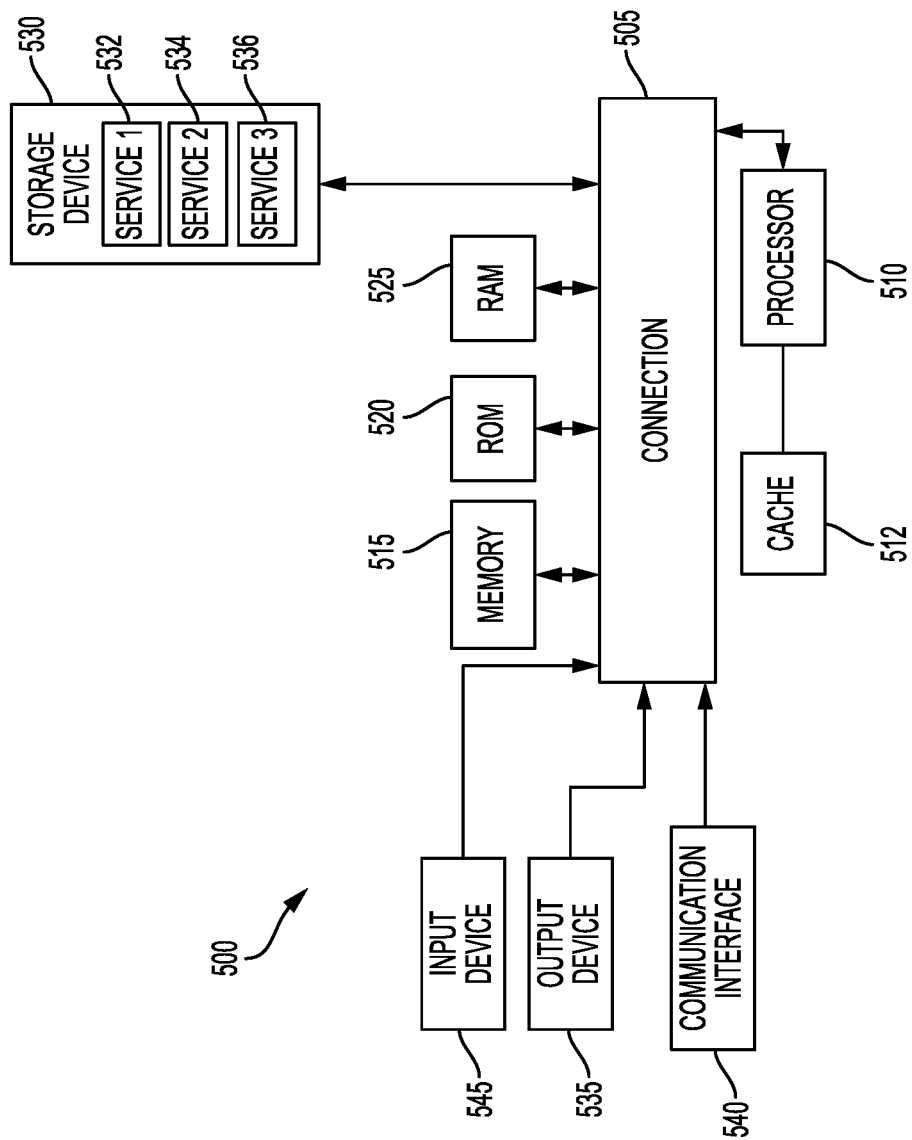
FIG. 5 illustrates components of a system for implementing the present technologies, in accordance one aspect of the present disclosure.

FIG. 5 shows an example of a system for implementing the present technology in accordance one aspect of the present disclosure. FIG. 5 illustrates computing system 500 in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache 512 of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures. Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving a command for determining displacement information of a tracking device for a period of time;
determining a reference point for the tracking device;
activating at least one sensor on-board the tracking device to collect data on movement of the tracking device;
locally determining the displacement information of the tracking device over the period of time based on the reference point and the data collected by the at least one sensor;
storing, at the tracking device, a record of the displacement information of the tracking device; and
transmitting, to a server, the record of the displacement information upon establishing a communication session with a nearby access point.

2. The method of claim 1, wherein the at least one sensor is one or more of an accelerometer, a gyroscope or a magnetometer of the tracking device.

3. The method of claim 1, wherein the communication session with the nearby access point is a Wi-Fi connection.

4. The method of claim 1, wherein the record identifies at least one location visited by the tracking device.

5. The method of claim 4, wherein the server determines a content conversion rate for at least one content based on the at least one location visited by the tracking device.

6. The method of claim 5, wherein the server sends the content conversion rate to a third party.

7. The method of claim 1, wherein the command for determining the displacement information is received from the server.

8. A tracking device comprising:
memory having computer-readable instructions stored therein; and
one or more processors configured to execute the computer-readable instructions to:
receive a command for determining displacement information of a tracking device for a period of time;
determine a reference point for the tracking device;
activate at least one sensor on-board the tracking device to collect data on movement of the tracking device;
locally determine the displacement information of the tracking device over the period of time based on the reference point and the data collected by the at least one sensor;
store, at the tracking device, a record of the displacement information of the tracking device; and
transmit, to a server, the record of the displacement information upon establishing a communication session with a nearby access point.

9. The tracking device of claim 8, wherein the at least one sensor is one or more of an accelerometer, a gyroscope or a magnetometer of the tracking device.

10. The tracking device of claim 8, wherein the communication session with the nearby access point is a Wi-Fi connection.

11. The tracking device of claim 8, wherein the record identifies at least one location visited by the tracking device.

12. The tracking device of claim 11, wherein the server determines a content conversion rate for at least one content based on the at least one location visited by the tracking device.

13. The tracking device of claim 12, wherein the server is configured to send the content conversion rate to a third party.

14. The tracking device of claim 8, wherein the command for determining the displacement information is received from the server.

15. One or more non-transitory computer-readable media comprising computer-readable instructions, which when executed by one or more processors of a tracking device, cause the tracking device to:
receive a command for determining displacement information of a tracking device for a period of time;
determine a reference point for the tracking device;
activate at least one sensor on-board the tracking device to collect data on movement of the tracking device;
locally determine the displacement information of the tracking device over the period of time based on the reference point and the data collected by the at least one sensor;
store, at the tracking device, a record of the displacement information of the tracking device; and
transmit, to a server, the record of the displacement information upon establishing a communication session with a nearby access point.

16. The one or more non-transitory computer-readable media of claim 15, wherein the at least one sensor is one or more of an accelerometer, a gyroscope or a magnetometer of the tracking device.

17. The one or more non-transitory computer-readable media of claim 15, wherein the communication session with the nearby access point is a Wi-Fi connection.

18. The one or more non-transitory computer-readable media of claim 15, wherein the record identifies at least one location visited by the tracking device.

19. The one or more non-transitory computer-readable media of claim 18, wherein the server determines a content conversion rate for at least one content based on the at least one location visited by the tracking device.

20. The one or more non-transitory computer-readable media of claim 19, wherein the content conversion rate indicates a number of times a corresponding user of the tracking device visited a location of at least one merchant associated with the at least one content.

* * * * *